UNITED STATES PATENT OFFICE.

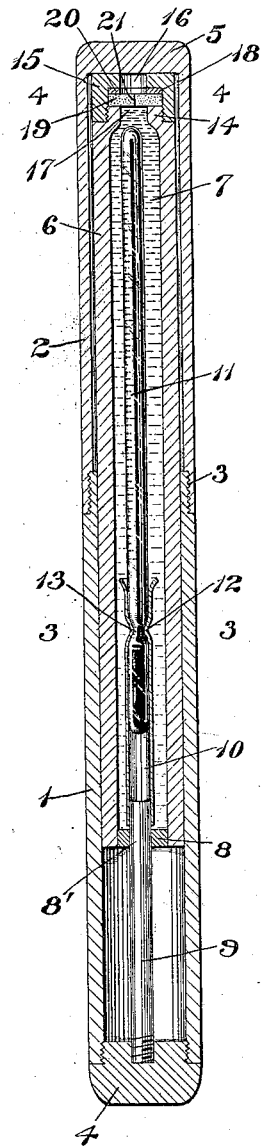
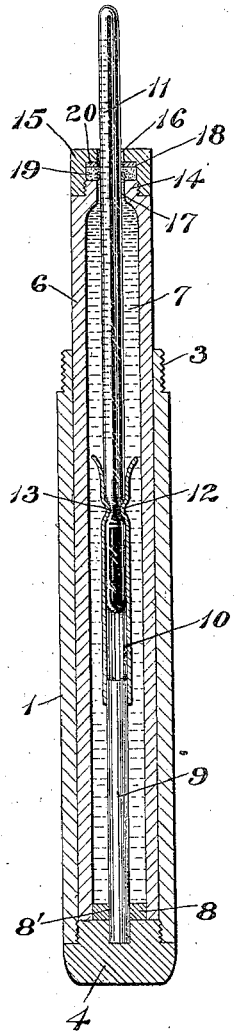
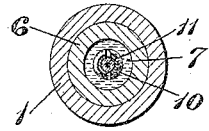
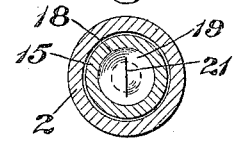
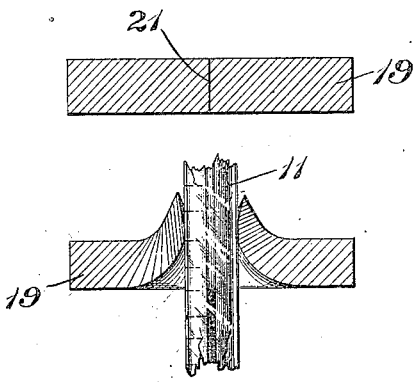

MARCUS C. HURD, OF CASSODAY, KANSAS.

STERILIZING-CASE.

1,092,716.  Specification of Letters Patent.  Patented Apr. 7, 1914.

Application filed July 9, 1913. Serial No. 778,159.

*To all whom it may concern:*

Be it known that I, MARCUS C. HURD, a citizen of the United States, residing at Cassoday, in the county of Butler and State of Kansas, have invented new and useful Improvements in Sterilizing-Cases, of which the following is a specification.

This invention relates to a sterilizing case, particularly designed for holding and sterilizing clinical thermometers, the object of the invention being to provide a case of this character adapted to contain a sterilizing solution in which the thermometer, while inclosed in the case is immersed, and from which case the thermometers may be readily removed when occasion requires.

It is the custom of physicians, when visiting a patient, of washing and wiping the thermometer after use. This operation, no matter how carefully performed, does not sterilize the thermometer, and disease germs may, therefore, be carried from one patient to another.

The object of the present invention is to provide a thermometer case of the character set forth in which the thermometer after being used, washed and wiped, may be stored and kept in a sterilizing solution, whereby it will be rendered completely sterile before being used again.

A further object of the invention is to provide a case which is proof against leakage and may be carried in any position without liability of loss of the sterilizing liquid not only when the case is closed but also when the case is open and the thermometer withdrawn.

The invention consists of the features of construction, combination and arrangement of parts, hereinafter fully described and claimed, reference being had to the accompanying drawing, in which:

Figure 1 is a vertical longitudinal section of a sterilizing case embodying my invention, showing the thermometer inclosed therein. Fig. 2 is a similar view showing the thermometer projected for withdrawal. Fig. 3 is a transverse section on the line 3—3 in Fig. 1. Fig. 4 is a transverse section on the line 4—4 of Fig. 1. Fig. 5 is an enlarged sectional view of the diaphragm or elastic closure, showing the same in normal and distended positions.

In carrying my invention into practice, I provide a thermometer case consisting of tubular sections 1 and 2 which are threaded at their inner ends for detachable coupling engagement, as shown at 3. The section 1 comprises a body section which is internally threaded at its outer end to receive a closure plug 4, while the section 2 constitutes a cap section having a closed outer end 5. The casing as thus constructed may be made of hard rubber or other suitable material.

Arranged within the casing is a reservoir 6 adapted to contain the sterilizing liquid 7. This reservoir is in the form of an elongated tube of less length than the casing, somewhat less internal diameter than the cap section 2 and of approximately the same diameter as the body section 1. The inner end of said reservoir 6 is snugly and slidably or reciprocatably fitted within the section 1, while its outer end normally projects into the section 2 and is exposed when said section 2 is detached.

At its inner end the reservoir tube 6 is provided with a head 8 having an opening 8' for the passage of a rod or stem 9 which is threaded or otherwise fixed at its outer end to the plug 4. The inner end of said rod or stem, which has a liquid-tight engagement with the opening 8', carries a spring holder 10 consisting of a series of spring arms adapted to receive and engage the inner end of the thermometer 11, which is adapted to be received in the reservoir 6 and to be completely submerged in the liquid 7 for the sterilization. The spring arms 10 flare outwardly at their free ends for ready insertion of the thermometer therebetween, and are provided with inbent projections 12 to interlock with an annular groove or recess 13 in the thermometer, whereby the latter is normally held against displacement, but may be inserted within and withdrawn from said spring holder by endwise pushing and pulling movements. The outer end of the reservoir 6 is provided with a reduced threaded projection 14 receiving a threaded cap 15, which projection and cap are formed with alined openings 16 and 17 through which the liquid 7 is introduced and also through which the thermometer may be inserted and withdrawn. The cap 15 is provided with a chamber 18 containing in its lower portion an elastic disk or diaphragm 19 which seats against the projection 14 and is held clamped against the same by a metallic washer 20, disposed in the upper portion of said chamber. This disk or diaphragm is made of rubber or other suitable material and is provided with a slit 21 in line with the openings 16 and 17 and opening in the washer into which opening 16 and washer opening the central portion of the disk is adapted to flex and expand under pressure from the thermometer, thus distending the walls of the slit and spreading the latter open for the passage of the thermometer. The slit is of such form that through the elasticity of the diaphragm the walls of the slit when relieved from pressure close and completely seal the slit and the opening 16 against the escape of the sterilizing solution, allowing the case to be held in any position without liability of leakage.

Assuming that the thermometer is contained within the case and immersed in the sterilizing solution, it will be apparent that it is in proper condition for use. When it is desired to employ the thermometer to take the temperature of a patient, the cap 2 is detached to expose the projecting portion of the reservoir 6, after which the section 1 and the said projecting portion of the reservoir 6 are respectively grasped in the hands of the operator, and said reservoir forced into the casing section so as to project the outer end of the thermometer through the opening 16, slit 21 in the flexible diaphragm 19 and openings in the washer 20 and cap 15, so that it may be withdrawn for use. After use, the thermometer is inserted down through said openings and slit until engaged with the spring holder, whereupon the reservoir 6 is drawn outward to normal position, causing the thermometer to pass wholly through the openings 16, 21, 20 and cap 15 and to be completely immersed in the sterilizing solution 7, after which the cap section 2 is reapplied to close the casing. The thermometer will then be completely closed for transportation while immersed in the sterilizing liquid, so that it will be rendered completely sterile before it is used again.

The reservoir may be replenished when required with the sterilizing liquid directly through the opening 16 upon removal of the cap 15, diaphragm 19 and washer 20, or in an emergency may be replenished by means of a dropper or syringe having a nozzle capable of being inserted through the slit 21.

The advantages of the device will be apparent to those versed in the art, and it will be understood that, while an embodiment of the invention adapted for effective use is disclosed, modifications may be made within the spirit and scope of the invention as defined in the appended claims.

Having thus described the invention, what I claim as new is:—

1. A device of the character described comprising a casing composed of detachable sections, a reservoir tube slidably fitted at one end in one of said sections and adapted to be inclosed at its projecting end by the other section, the latter-named end of the tube having a self-sealing closure, and a thermometer support fixed to the first-named casing section and slidably engaged by the inner end of the reservoir, whereby said thermometer is adapted to be held immersed in a fluid contained within the reservoir and to be projected and retracted through the self-sealing closure by a relative sliding motion of the reservoir.

2. A device of the character described comprising a casing formed of a body section and a cap section, a reservoir tube adapted to contain a sterilizing solution, said tube being slidably fitted at one end in the body section and provided at its outer end with a flexible diaphragm having a normally closed slit therein, and a thermometer holder secured to the body section of the casing and projecting into the reservoir and in sliding engagement therewith, whereby the thermometer is adapted to be inserted through the slit and held by said holder and to be projected by a relative sliding motion between the body section of the casing and the reservoir.

3. A device of the character described comprising a casing body, a stem arranged within one end thereof and carrying a thermometer holder, a reservoir slidably fitted at one end into said body section and slidably engaging said stem, said reservoir being provided at its outer end with a closure comprising a diaphragm having a slit therein, and a cap section adapted to engage said body section and inclose the projecting end of the reservoir.

In testimony whereof I affix my signature in presence of two witnesses.

MARCUS C. HURD.

Witnesses:
D. A. MARTENS,
H. B. GERBRAND.

---

Copies of this patent may be obtained for five cents each, by addressing the "Commissioner of Patents, Washington, D. C."